(12) United States Patent
John

(10) Patent No.: US 8,027,860 B2
(45) Date of Patent: Sep. 27, 2011

(54) SYSTEMS AND METHODS FOR PLANNING DEMAND FOR CONFIGURABLE PRODUCTS

(75) Inventor: Thomas John, Weinheim (DE)

(73) Assignee: SAP AG, Walldorf (DE)

( * ) Notice: Subject to any disclaimer, the term of this patent is extended or adjusted under 35 U.S.C. 154(b) by 1393 days.

(21) Appl. No.: 11/013,374

(22) Filed: Dec. 17, 2004

(65) Prior Publication Data

US 2005/0159997 A1  Jul. 21, 2005

(30) Foreign Application Priority Data

Dec. 17, 2003 (EP) .................................. 03079024

(51) Int. Cl.
*G06Q 10/00* (2006.01)

(52) U.S. Cl. ...................................................... 705/7.25

(58) Field of Classification Search .................. None
See application file for complete search history.

(56) References Cited

U.S. PATENT DOCUMENTS

| | | | | |
|---|---|---|---|---|
| 5,953,707 | A * | 9/1999 | Huang et al. ..................... | 705/10 |
| 5,974,395 | A * | 10/1999 | Bellini et al. ..................... | 705/9 |
| 6,816,839 | B1 * | 11/2004 | Gung et al. ..................... | 705/7.31 |
| 6,876,895 | B2 * | 4/2005 | Seimiya et al. ................ | 700/106 |
| 7,039,602 | B1 * | 5/2006 | Kapadia et al. ................ | 705/26 |
| 2002/0103686 | A1 * | 8/2002 | Slocum ............................. | 705/8 |
| 2002/0147622 | A1 * | 10/2002 | Drolet et al. ..................... | 705/7 |
| 2003/0055843 | A1 | 3/2003 | Chiu | |
| 2003/0126023 | A1 | 7/2003 | Crampton et al. | |
| 2004/0193500 | A1 * | 9/2004 | Brown et al. ................... | 705/22 |

FOREIGN PATENT DOCUMENTS

| | | |
|---|---|---|
| DE | 102 40 338 A1 | 9/2003 |
| EP | 0 459 626 A2 | 12/1991 |
| EP | 0 770 967 A2 | 5/1997 |
| WO | WO 02/27614 A1 | 4/2002 |

OTHER PUBLICATIONS

Mingyuan Chen and Weimin Wang, A linear programming model for integrated steel production and distribution planning, 1997, International Journal of Operations & Production Management, vol. 17n6, pp. 592.*

"The Role of the OLAP Server in a Data Warehousing Solution," DM Review, Powell Publications, West Allis, WI, US, Nov. 30, 1999, pp. 1-18.

European Search Report, dated May 4, 2004 (3 pages).

* cited by examiner

*Primary Examiner* — Brandi P Parker

(74) *Attorney, Agent, or Firm* — Finnegan, Henderson, Farabow, Garrett & Dunner, LLP

(57) ABSTRACT

Systems and methods are disclosed for planning demand of a product, such as a configurable product. In one embodiment, a method is provided for planning demand for a configurable product in a managed supply chain. The method may comprise the steps of storing data relating to the possible combinations of characteristics defining configurable products, wherein product dependent characteristic data and product independent characteristic data are stored dependently with respect to one another, and converting a planning demand for a configurable product into a planning demand for an actual combination of characteristics defining a configured product.

23 Claims, 2 Drawing Sheets

SYSTEMS AND METHODS FOR PLANNING DEMAND FOR CONFIGURABLE PRODUCTS

BACKGROUND OF THE INVENTION

I. Field of the Invention

The present invention generally relates to computerized planning systems and methods and to such systems and methods for planning demand for products. More particularly, the invention relates to planning systems and methods for planning demand for a configurable product in a managed supply chain.

II. Background Information

Demand planning is used to forecast the demand for products, such as configurable products. A configurable product is a product having one or more product dependent characteristics. Demand planning works with characteristics-based forecasting. For example, a configurable products such as a car has certain attributes (also referred to as product dependent characteristics) such as color, model and engine. Conventional demand planning identifies certain primary attributes, such as model, and other secondary attributes, which are typically less important, such as battery type.

In the conventional demand planning, in order to reduce the volume of data to be processed in demand planning, only the possible combinations of primary attributes are stored independently. One problem with this approach to demand planning is that planned characteristics can only be used for planning configurable products, and not for configured finished products and assemblies. Another problem with conventional demand planning is that it is not possible to generate configured orders (e.g., CDP and IBASE orders) for the explosion of the Production Process Model (PPM) and Integrated Product and Process Engineering (iPPE). An additional problem with conventional demand planning is that configured sales orders do not take into account configured forecasts.

In view of the foregoing, it is an object of the present invention to address these and other problems encountered in conventional demand planning systems and methods.

SUMMARY OF THE INVENTION

Consistent with embodiments of the present invention, computerized systems and methods are disclosed for planning demand for products, such as configurable products.

According to one embodiment, a method is provided for planning demand for a configurable product in a managed supply chain, the configurable product having at least one product dependent characteristic and at least one product independent characteristic. As disclosed herein, the method may comprise the steps of: storing data relating to the possible combinations of characteristics defining configurable products, wherein product dependent characteristic data and product independent characteristic data are stored dependently with respect to one another; and converting a planning demand for a configurable product into a planning demand for an actual combination of characteristics defining a configured product. In this way, the method may allow configured products to be planned without storing all combinations of the product characteristics.

In a further embodiment, the method includes the step of selecting a group of characteristics to represent a plurality of products, wherein the selection defines a subset of the configurable products on the basis of a product independent characteristic and the product dependent characteristics associated with the product independent characteristic. The method may also include the steps of: loading, in response to the selecting step, the data relating to the subset; determining the characteristic combinations for the subset of data; and storing the characteristic combinations for the subset of data. With this embodiment, the amount of data to be handled in a demand planner may be reduced, resulting in a more efficient use of processing power and storage capacity.

According to yet an additional embodiment of the invention, the method may include the steps of: receiving a sales order; comparing the sales forecast and the sales order; and, if there is a match between the characteristics defined in the subset of data for the sales forecast and the sales order, consuming on a characteristic level, the matching characteristics in the sales order from at least a portion of the sales forecast. In this way, sales forecasts may be consumed on a characteristic level.

In accordance with another embodiment of the present invention, there is provided a demand planner for planning demand for a configurable product in a managed supply chain, the configurable product having at least one product dependent characteristic. The demand planner may be operatively associated with a data storage system to store data relating to a plurality of configurable products, and operatively associated with a user interface for receiving input of a selection to be represented for a plurality of products. Further, as disclosed herein, the demand planner may comprise a storage medium having recorded therein processor readable code processable to plan demand for a configurable product. The code may comprise: storing code processable to store data relating to the possible combinations of characteristics defining configurable products, wherein product dependent characteristic data and product independent characteristic data are stored dependently with respect to one another, so that a planning demand for a configurable product may be converted into a planning demand for an actual combination of characteristics defining a configured product.

According to a further embodiment, there is provided a user terminal comprising means operable to perform one or more steps of methods consistent with embodiments of the present invention.

In accordance with yet an additional embodiment of the present invention, there is provided a program storage device readable by a processor or processing apparatus. The device may embody a program or set of instructions executable by a processor to perform one or more steps of methods consistent with embodiments of the present invention.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects consistent with the present invention. In the drawings.

DETAILED DESCRIPTION

Figure 1:
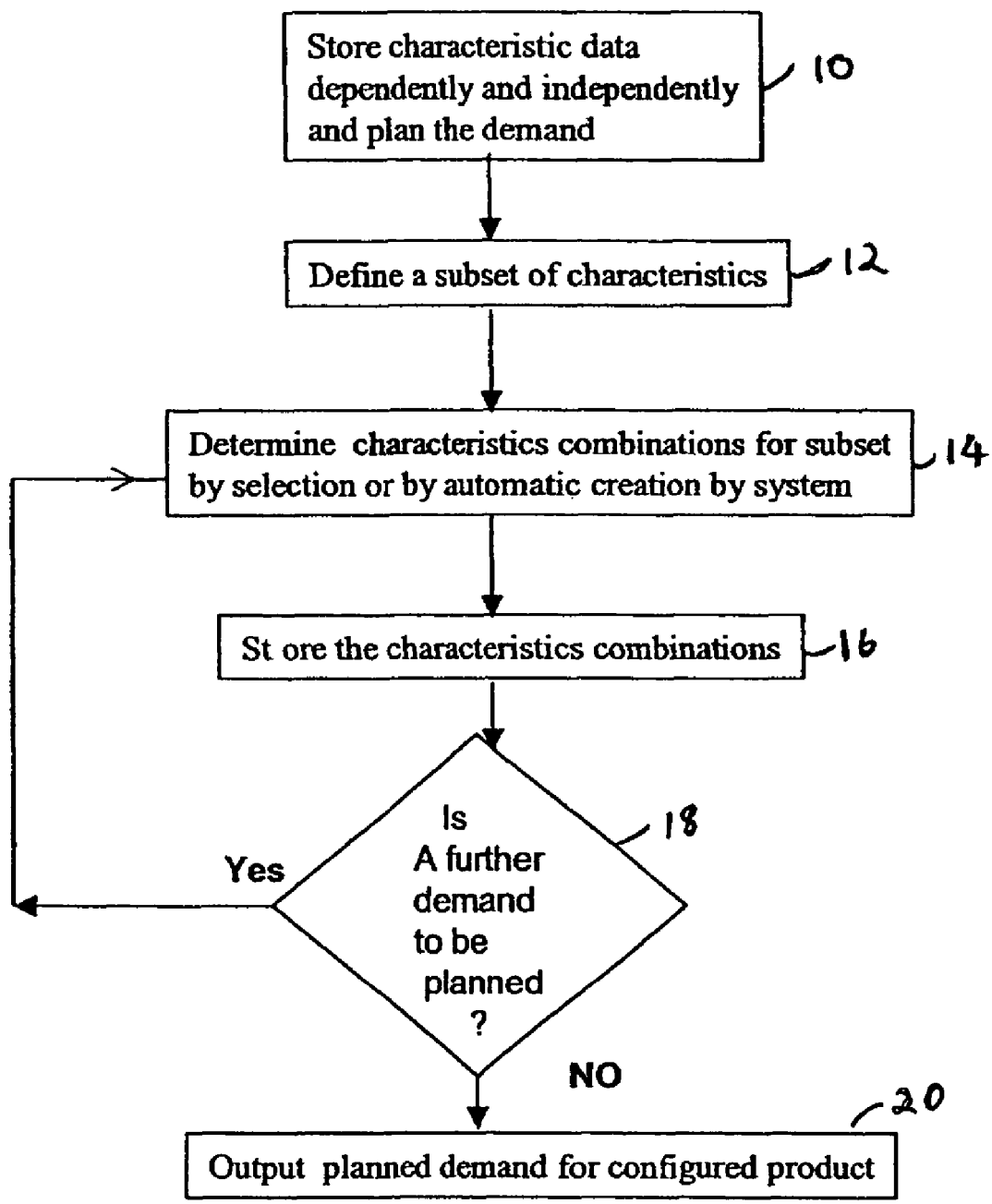
FIG. 1 is a flow chart of an exemplary method for demand planning, in accordance with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

In the following description, certain expressions are used, which are known to persons skilled in the art of demand planning and supply chain management. Thus, by way of example only and in a non-limiting manner, the following explanation of certain expressions is included.

A configurable product, such a personal computer (PC), are available in different variants. Configurable products in demand planning have characteristics that can be planned and values that are assigned to a profile and whose validity period may be limited. A configured product, on the other hand, is one variant exactly, meaning that all the characteristics have a value.

A characteristic typically describes the attributes of an object, such as a product, for example, length. A characteristic value typically describes the features of a characteristic, for example, 10 centimeters. An object may refer to a product or a component of a product.

Characteristics in demand planning typically include product independent characteristics and product dependent characteristics. Product independent characteristics typically relate to business planning objects (e.g., customer or region). They may be categorized as characteristics, key figures, and units. Product dependent characteristics, on the other hand, include attributes that describe and differentiate objects, such as length, color, and weight. A class refers to a group of characteristics that can be attributed to a product. A class is a grouping of similar objects according to common characteristics. A configurable product is typically defined in demand planning by master data.

Characteristics Dependent Planning (CDP) is used predominantly with configurable products or for products which require more characteristics than just the material number (or product number) to be able to uniquely identify a product in certain situations. A benefit of working with configurable products is that the number of valid characteristic combinations and their various characteristic values would amount to infinity if they were incorporated in the product master data. Therefore, characteristics are used together with master data to classify and specify objects, such as products, stocks, and resources.

Characteristics are physically located in a data storage system, such as the schedule line in LiveCache, but logically they belong at the item.

Characteristic Based Forecasting (CBF) is a technique used in particular in demand planning. In CBF, a set of characteristics is defined in order to forecast components of assembled products. The set of characteristics is called the CBF characteristics, and may also be referred to as the product dependent characteristics. For example, if the product is a car, the product dependent characteristics of the car may include engine size. Products having product dependent characteristics are referred to as configurable products. In demand planning, however, other product characteristics are also typically taken into account, such as sales region and customer channels. Such other product characteristics are referred to as product independent characteristics or "free" characteristics.

A CBF table, also referred to in the art as a characteristic table, is a planning object and contains characteristic combinations. For example, a configurable product, such as a car, may have product dependent characteristics including "color" and "engine size", wherein the characteristic color may have three characteristic values: green, red and blue, and the characteristic engine size may have two characteristic values: 1.6 liter and 2.0 liter. The CBF table therefore includes all the combinations of these particular characteristic values. It will be understood that in practice a product may have several tens of characteristics, each having a variety of characteristic values. In such typical cases, the data to be handled is very large.

In characteristics-based forecasting, the data structure is sometimes defined in a hierarchical manner. For example, the data structure may include a plurality of levels, for example, a product family level, a product level, and a characteristic level. The characteristic level is the most detailed level, in this example, and the product family level is the least detailed level. Demand planning may be carried out on any level or mixture of levels. If it is, for example, carried out on a product family level, the data in the more detailed levels is aggregated. If on the other hand, it is carried out on a more detailed level, the data may be disaggregated.

A CBF profile is typically the planning profile and contains characteristic tables for a configurable material. Object dependencies describe the co-dependencies between objects. For example, a certain object including a certain attribute may be required to also include a further attribute.

Using the CBF planning process in the demand planning (DP) may imply the following structure: free characteristics, for example, location and sales region, are used to describe product independent characteristics; and CBF characteristics defined in the profile for each product are used individually to describe objects, for example, a memory or central processing unit (CPU) of a computer.

Demand Planning works with characteristics-based forecasting. As a medium-term planning method, the aim is not necessarily to take into account all the characteristic combinations but rather to plan at a high aggregation level to obtain an overview. Characteristic-based forecasting profiles, defining all the characteristics and characteristic values for a product, may provide the basis for this.

In one embodiment, a selection may typically be made by a user and may specify certain characteristics including certain characteristic values or not (in which case all the data is aggregated), thereby defining a set of characteristic value combinations, which may be referred to as CVC. The number displayed then just represents a number for each time period over which a demand is planned (i.e., a time bucket).

The set of characteristic value combinations expresses the characteristics a product or component may have, for example, the product "computer A" may be defined as having a product dependent characteristic, "hard disk". The characteristic value is a hard disk of type 40 GB, for example. The characteristic value combinations may be stored as master data. Transactional data, on the other hand, is the planning data and will vary depending on the particular demand plan being carried out.

In conventional demand planning, these planned characteristics can only be used for planning configurable products, and not for configured products. Embodiments of the present invention may allow configured products to be planned. According to one embodiment of the invention, the product used during planning is the same as that used in the bill of material.

In a further embodiment of the invention, it is possible for configured sales orders to consume configured forecasted requirements in an industry, such as the plastic sheeting industry. According to this embodiment, a contract may be made between a manufacturer and a customer guaranteeing the customer a certain specification. The dimensions and acceptance dates may remain open.

In accordance with a further embodiment of the present invention, planning, consumption, and production are carried out at customer level for specifications. This ensures that the specification agreed with the customer is also delivered. In a further embodiment, it may be desirous that a specific quantity is produced for a customer, such as might be the case in the chemical industry. The specification received by the customer remains open and can only be determined upon release to production.

Embodiments of the invention have application not only to finished products, but also for semi-finished configurable and configured products (or assemblies). In the case of semi-finished products, the sales forecast may additionally be replaced by dependent demand, reservations and transport orders, taking tolerance ranges into account.

FIG. 1 shows a flow chart of an exemplary method for demand planning, in accordance with an embodiment of the present invention. As shown in FIG. 1, the exemplary process includes the steps of: storing characteristic data dependently and independently, and planning the demand (step 10); defining a subset of characteristics (step 12); determining characteristics combinations for the subset by selection or by automatic creation by the system (step 14); and storing the characteristic combinations (step 16). Further, it may be determined whether a further demand is to be planned (step 18) and, if the answer is "Yes", the method may return to step 14. Alternatively, if the answer is "No", a planned demand for a configured product is provided as output (step 20).

In accordance with an embodiment of the present invention, there is provided a method for planning demand for a configurable product in a managed supply chain, the configurable product having at least one product dependent characteristic and at least one product independent characteristic. The method may comprise the step of storing data relating to the possible combinations of characteristics defining configurable products, wherein product dependent characteristic data and product independent characteristic data are stored dependently with respect to one another. By storing product dependent characteristic data and product independent characteristic dependently, it is possible to convert a demand plan for a configurable product to a planning demand for an actual combination of characteristics defining a configured product. This is because by defining the product independent data and dependent data dependently, the dependency results in a reduction of the volume of data to be processed. For example, if product independent data, such as location "U.S.", is stored dependently with respect to the characteristics of the products to be planned in the U.S., only those characteristics for products in the U.S. are taken into account. For instance, for the configurable product of a car, the characteristic value "right hand drive" will not be taken into account. Thus, this embodiment can reduce the number of combination calculations to be carried out and stored.

In a further embodiment, the method may include the steps of: selecting a group of characteristics to represent a plurality of products, wherein the selection defines a subset of the configurable products on the basis of a product independent characteristic and the product dependent characteristics associated with the product independent characteristic; loading, in response to the selecting step, the data relating to the subset; determining the characteristic combinations for the subset of data; and storing the characteristic combinations for the subset of data.

By way of a non-limiting example, if the selection defines a subset on the basis of the product independent characteristic "location" with characteristic value "U.S.", the subset will include only those product dependent characteristics and product characteristic values associated with the "U.S." For instance, products that would not function in the U.S. due to particular characteristics or characteristic values, for example, relating to video or mobile phone standards, are not associated with products for the location "U.S.", are not selected. The selection may be made by a user or by the system. By making a selection the volume of data is implicitly reduced due to the definition of a subset on the basis of the selection. In a further embodiment, only actual combinations for characteristics defining configured products are stored. Thus, the storage capacity required is reduced. Thus, improving the efficiency of the use of memory in the system. Further, by calculating only combinations defined by the subset, the processing power of the system if used more efficiently.

In a further embodiment, the characteristic combinations are combinations of product dependent characteristics. For example, if a car has product dependent characteristics color and engine size, with characteristic values green, red and blue, and 1.6, 1.8 and 2.0 liter, respectively, the characteristic combination refer to those combinations of the characteristic values. In this simple example, there are nine combinations. Typically, however, the number of characteristics for a configurable product is large and the number of characteristic values for each characteristic is also large, resulting in a very large amount of data to be processed.

In a further embodiment, the subset is a consumption group. For example, a consumption group may define any product independent characteristic, such as location, region, and customer channel. Further examples include, but are not limited to, order type, reason for the order, sales organization, distribution channel, division, sales group, sales office, business area, shipping conditions, customer ordering method, cost center, customer groups, and the like.

In another embodiment, the method may further include the step of generating an identifier to take an object related dependency between at least two product dependent characteristics into account in the step of determining the characteristic combinations. For example, for the configurable product of a car, certain characteristics are dependent on one another. For example, if a car has a certain engine size, the type of battery suitable is limited. Thus, there is an object related dependency between the engine size and the battery type. The identifier identifies that if a particular engine size is included in the characteristic values, the characteristic value for the relevant battery type is identified. Thus, the combinations for those battery types which are not suitable for use with the particular engine are not calculated and are not stored. Thus, further improving the efficiency of the processing power of the system and the use of the memory capacity.

Typically, the object related dependency is defined on the bill of material (BOM). The sales forecast typically contains two kinds of configurations from demand planning. On configuration is to explode the bill of material (PPM and iPPE), and the second configuration is the identifier for consumption. Both configurations have the same values during the release to a supply network planner. However, it is also possible to provide a business add-in to enrich the configuration for explosion, because for production purposes, often more characteristics are required than for consumption.

In a further embodiment, the identifier is stored in a cache. For example, the identifier may be stored in a cache for sales forecast, sales order, dependent demand, reservations and transport orders. This means the system can search directly in the cache, for example, LiveCache, for all orders with a particular characteristic combination, in a very fast manner.

A further embodiment includes the step of releasing the actual combination of characteristics defining a configured product to a supply network planner. In this way, the demand planner can release its output directly to the supply network planner. This improves the efficiency of the managed supply chain.

In another embodiment, forecasts and sales orders are stored as data objects in a cache on a computer system. For example, characteristics are stored in a database, such as a hard drive on a computer system or elsewhere. Pointers are contained in the data objects in cache to the characteristics in memory. Although the data objects and characteristics may be stored on the same machine, they may be stored on different machines that are connected via a communications link or the like.

In systems consistent with the present invention, a demand planning application may use forecasts to determine which resources to allocate to produce particular products. The demand planning application may receive sales order from customers. Each sales order may contain line items that define information, such as the product being purchased, the amount of product, the customer, etc. Sales orders that are input to the planning application may the place of corresponding forecasts already stored by the planning application. What this means is that requirements from sales order replace requirements from corresponding forecasts in cache. This "replacement" process is referred to as "consuming". Thus, a sales order "consumes" a forecast or some portion thereof. In one embodiment of the present invention, the actual combination of characteristics defining a configured product represents requirements of a sales forecast.

According to a further embodiment, the method may include the steps of: receiving an order; comparing the sales forecast and the order; and, if there is a match between the characteristics defined in the subset of data for the sales forecast and the order, consuming on a characteristic level, the matching characteristics in the order from at least a portion of the sales forecast, wherein the consuming step comprises replacing requirements of the sales forecast with requirements of the order. Thus, by converting a configurable product into a configured product, requirements from orders replace requirements from corresponding forecasts on a characteristic or an attribute level. This is in contrast to conventional demand planning applications, where the lowest level on which order can consume forecasts is the product level. The order may include one or several types of order, including, but not limited to sales order, dependent demand, reservation or transport order. A further embodiment of the invention includes the step of storing the orders in a cache so that fast access is gained to all orders with a particular characteristic combination.

Figure 2:
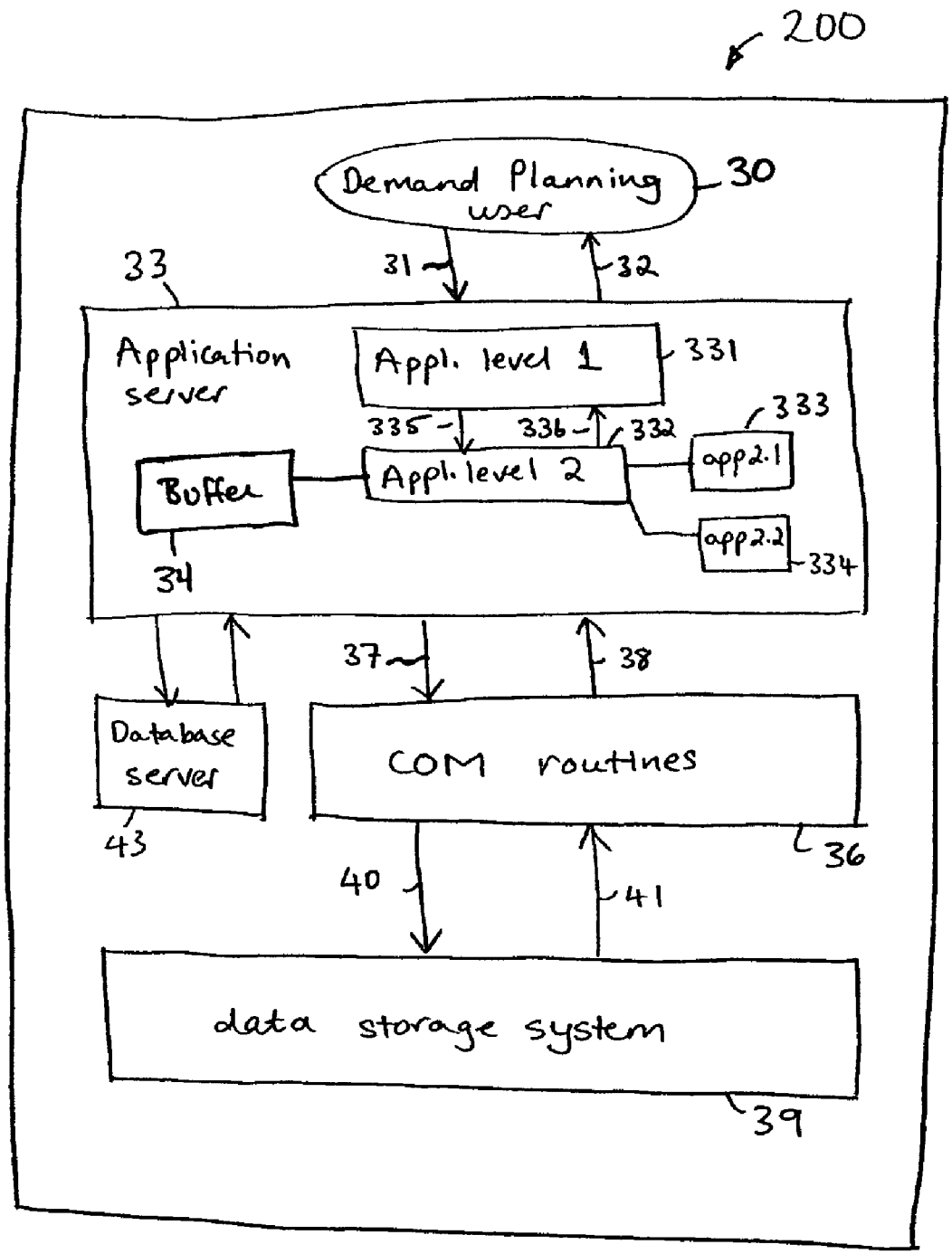
FIG. 2 illustrates an exemplary system architecture for demand planning, in accordance with an embodiment of the present invention.

FIG. 2 shows an exemplary system architecture for demand planning, in accordance with an embodiment of the present invention. In particular, FIG. 2 shows an exemplary system 200 in which one or more steps of the methods described herein may be implemented. For example, system 200 may be configured to implement the data flow and data processing steps initiated by a demand planning apparatus or method consistent with embodiments of the present invention with characteristics-based forecasting.

As shown in FIG. 2, the system 200 includes a demand planning user 30, which may comprise a graphic user interface (GUI) with which a user interacts. Typically, the user makes a request or inputs data 31 to an application server 33. In one embodiment, the user inputs a first initial value, at least one second initial value and changed values, if and when desired. Having provided data and/a request, the user may receive an output in the form of a delivery of data 32 from the application server 33. The application server 33 may run the application logic which carries out the demand planning. Also provided is a database server 43 which may store a demand planning application including code for carrying out the demand planning.

The system 200 may also include a programming system 36 for running Common Object Model (COM) routines and defining a network programming system. The COM routines may receive a request or an input of data 37 from the application server 33. Furthermore, the COM routines deliver data 38 to the application server 33. In one embodiment, the function of the COM routines is to carry out data transformation and data calculation. The COM routines may be in association with a data storage system 39, such as an object-oriented database, for example, a LiveCache. The COM routines may send a request or an input of data 40 to the data storage system. Further, the data storage system 39 may deliver data 41 to the COM routines.

In one embodiment of the present invention, there is provided a demand planner apparatus for planning demand for a configurable product having at least one product dependent characteristic in a managed supply chain. The demand planner may be operatively associated with a data storage system to store data relating to a plurality of configurable products, and operatively associated with a user interface for receiving input of a selection to be represented for a plurality of products. The demand planner may comprise a storage medium having recorded therein processor readable code processable to plan demand for a configurable product in a managed supply chain. The code may comprise storing code processable to store data relating to the possible combinations of characteristics defining configurable products, wherein product dependent characteristic data and product independent characteristic data are stored dependently with respect to one another, so that a planning demand for a configurable product is converted into a planning demand for an actual combination of characteristics defining a configured product.

In a further embodiment, the code of the demand planner further comprises: a selection determining code processable to determine a selection of characteristics to represent a plurality of products, wherein the selection defines a subset of the configurable products on the basis of a product independent characteristic and the product dependent characteristics associated with the product independent characteristic; loading code processable, in response to the determining code, to load the data relating to the subset; characteristic combination determining code processable to determine the characteristic combinations for the subset of data; and characteristic combinations storing code processable to store the characteristic combinations for the subset of data.

In one embodiment, the application logic is written in Advanced Business Application Programming (ABAP), a programming language developed by SAP AG (Walldorf, Germany) for application development. However, embodiments of the invention are not limited in this respect and other programming languages are also suitable depending on the particular application that embodiments of the present invention are incorporated into.

Referring again to FIG. 2, the application server 33 may comprise a plurality of application levels 331, 332, 333, 334. The first application level 331 may be adapted to carry out the request processing which is input by the demand planning user 30. At this level, the user request may be processed without processing the actual data. Further, in one embodiment, data is not manipulated at the first application level 331. The second application level 332, 333, 334 may be adapted to carry out the data processing. The second application level 332 may comprises two sub-levels: a second application sub-level 333 that is adapted to carry out a high level of data processing, and a second application sub-level 334 that is adapted to carry out a low level of data processing. In other words, the second application sub-level 333 may be adapted to carry out more general data processing than the second application sub-level 334. Further, in one embodiment, the combination calculations are carried out by the more general, second application sub-level 333.

The application server 33 may be arranged to carry out CBF. To achieve this, the application logic may carry out the functions of performing a CBF data transformation, a CBF data calculation on a higher level by second application sub-level 333, and a CBF data calculation at a lower level by second application sub-level 334. In order to carry out the data calculations, a buffer 34 may be provided in to which master data of the implicitly selected products is loaded. In one embodiment, the data to be processed is structured in a table within the buffer 34.

Consistent with an embodiment of the invention, data may be modeled using internal tables in the buffer 34. Several entries and more fields are used which model the relationship between owner and members.

It will be understood that depending on other applications comprised in the system 200, the system may include a plurality of GUIs and applications. Thus, while only one GUI and application are shown in FIG. 2, other GUIs and applications may also be comprised in the system.

In demand planning applications consistent with the present invention, the internal logic for dealing with characteristic-based forecasting data may incorporate the following: the data are stored in a data storage system 39, for example, an object-oriented data storage system, such as a LiveCache (LC). Further, the data may be represented with three technical characteristics for profile, table, and row. The presentation of the data for the application may use the CBF characteristics which describe the features of specific products. In one embodiment, the calculation required between the internal representation of the CBF data and the application representation of the data are done in a characteristic calculation function group on the application server 33. The CBF calculations in this function group are based on the data of a global internal table. The data read from the data storage system, for example, LiveCache (LC), are stored there together with all the results stored in the buffer 34 together with all the results calculated in order to provide data to the application server 33.

Embodiments of the invention as described herein can be implemented in digital electronic circuitry, or in computer hardware, firmware, software, or in any combination thereof.

Systems and apparatus according to the present invention can be implemented in a computer program product tangibly embodied in a machine readable storage device for execution by a programmable processor. Further, methods and steps consistent with the present invention can be performed by a programmable processor executing a program or set of instructions to perform functions of the invention by operating on input data and generating output. Moreover, embodiments of the invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, embodiments of the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While certain features and embodiments of the invention have been described, other embodiments of the invention will be apparent to those skilled in the art from consideration of the specification and practice of the embodiments of the invention disclosed herein. For example, in the embodiments described certain products, characteristics and other parameters are referred to. The present invention is not limited to these particular products, characteristics or other parameters, and these are given by way of example only. Further, the present invention has broad application to the demand planning of any product, including configurable products. Moreover, although embodiments of the invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for planning demand for a configurable product in a managed supply chain, comprising:
storing, using a processor, characteristic values relating to product-dependent characteristics and product-independent characteristics of configurable products, wherein the storing comprises storing product-dependent characteristic values and product-independent characteristic values dependently with respect to one another in a hierarchical manner;
calculating, using the processor, possible characteristic value combinations of the product-dependent characteristics defining a configurable product, the number of possible characteristic value combinations being dependent on a stored product-independent characteristic value, wherein the calculating comprises:
generating an identifier that indicates an object-related dependency between product-dependent characteristic values of the configurable product;
storing the calculated characteristic value combinations of the product-dependent characteristics:
generating, using the processor, a planning demand for the configurable product comprising at least one of the possible characteristic value combinations of product-dependent and product-independent characteristics defining the configurable product; and
converting, using the processor, the planning demand for the configurable product into a planning demand for an actual characteristic value combination defining a configured product.

2. The method of claim 1, further comprising:
selecting a group of characteristics to represent a plurality of the configurable products, wherein the selection defines a subset of the plurality of configurable products on the basis of a product-independent characteristic value and at least one product-dependent characteristic value associated with the product-independent characteristic value;
loading, in response to the selecting, stored characteristic values relating to the subset;
determining at least one characteristic value combination for the configurable products of the subset; and
storing the characteristic value combinations.

3. The method of claim 2, wherein storing the characteristic value combinations comprises storing only actual combinations of characteristic values defining the configurable products.

4. The method of claim 2, wherein the characteristic value combinations are combinations of product-dependent characteristic values.

5. The method of claim 2, wherein the subset is a consumption group.

6. The method of claim 2, further comprising:
calculating the characteristic value combinations based on the object-related dependency between the product-dependent characteristics.

7. The method of claim 6, further comprising:
storing the identifier in a cache.

8. The method of claim 1, further comprising:
releasing the actual characteristic value combination defining the configured product to a supply network planner.

9. The method of claim 1, wherein the actual characteristic value combination defining the configured product represents requirements of a sales forecast.

10. The method according to claim 9, further comprising:
receiving an order;
comparing the sales forecast and the order; and
when the characteristic values of the sales forecast match characteristic values of the order, consuming, on a characteristic level, the matching characteristic values in the order from at least a portion of the sales forecast.

11. The method of claim 10, wherein the order comprises at least one of a sales order, a dependent demand, a reservation, and a transport order.

12. The method of claim 10, further comprising:
storing the order in a cache to enable access to orders with a particular characteristic value combination.

13. The method of claim 10, wherein consuming further comprises:
replacing requirements of the sales forecast with requirements of the order.

14. An apparatus for planning demand for configurable products in a managed supply chain, comprising:
a computer-readable storage medium; and
a processor coupled to the computer-readable storage medium, wherein the computer-readable storage medium stores instructions for controlling the processor, and wherein the processor, being operative with the instructions, is configured to:
store characteristic values relating to product-dependent characteristics and product-independent characteristics of configurable products, wherein product-dependent characteristic values and product-independent characteristic values are stored dependently with respect to one another in a hierarchical manner;
calculate possible characteristic value combinations of the product-dependent characteristics defining a configurable product, the number of possible characteristic value combinations being dependent on a stored product-independent characteristic value, wherein the calculating comprises:
generating an identifier that indicates an object-related dependency between product-dependent characteristic values of the configurable product;
store the calculated characteristic value combinations of the product-dependent characteristics;
generate a planning demand for the configurable product comprising at least one of the possible characteristic value combinations of the product-dependent and product-independent characteristic values defining the configurable product; and
convert the planning demand for the configurable product into a planning demand for an actual characteristic value combination of characteristics defining a configured product.

15. The apparatus of claim 14, wherein the processor is further configured to:
determine a selection of characteristics to represent a plurality of the configurable products, wherein the selection defines a subset of the plurality of configurable products on the basis of a product-independent characteristic value and product-dependent characteristic values associated with the product-independent characteristic value;
load stored data relating to the subset;
determine characteristic value combinations for the subset; and
store the characteristic value combinations.

16. A program storage device readable by a processor, the program storage device storing a set of instructions executable by the processor to perform a method for demand planning, the method comprising the steps of:

storing characteristic values relating to product-dependent characteristics and product-independent characteristics of configurable products, wherein the storing comprises storing the product-dependent characteristic values and the product-independent characteristic values dependently with respect to one another in a hierarchical manner;

calculating possible characteristic value combinations of the product-dependent characteristics defining a configurable product, the number of possible characteristic value combinations being dependent on a stored product-independent characteristic, wherein the calculating comprises:

generating an identifier that indicates an object-related dependency between the product-dependent characteristic values of the configurable product;

storing the calculated characteristic value combinations of the product-dependent characteristics;

generating a planning demand for the configurable product comprising at least one of the possible characteristic value combinations of product-dependent and product-independent characteristics defining the configurable product; and converting the planning demand for the configurable product into a planning demand for an actual characteristic value combination of characteristics defining a configured product.

17. The program storage device of claim 16, further comprising:

selecting a group of characteristics to represent a plurality of the configurable products, wherein the selection defines a subset of the plurality of configurable products on the basis of a product-independent characteristic value and product-dependent characteristic values associated with the product-independent characteristic value;

loading, in response to the selecting, stored characteristic values relating to the subset;

determining characteristic value combinations for the subset; and storing the characteristic value combinations.

18. The program storage device of claim 17, wherein storing the characteristic value combinations comprises storing only actual characteristic value combinations for characteristics defining the configurable products.

19. The program storage device of claim 17, wherein the characteristic value combinations are combinations of product-dependent characteristic values.

20. The program storage device of claim 16, wherein the actual characteristic value combination defining the configured product represents requirements of a sales forecast.

21. The program storage device of claim 20, further comprising:

receiving an order;

comparing the sales forecast and the order; and when the characteristic values of the sales forecast match characteristic values of the order, consuming, on a characteristic level, the matching characteristic values in the order from at least a portion of the sales forecast.

22. A computer-implemented method for planning demand for a configurable product in a managed supply chain, comprising:

storing, using a processor, characteristic values relating to product-dependent characteristics and product-independent characteristics of configurable products, wherein the storing comprises storing the product-dependent characteristic values and the product-independent characteristic values dependently with respect to one another in a hierarchical manner;

calculating, using the processor, possible characteristic value combinations of the product-dependent characteristics defining a configurable product, the number of possible characteristic value combinations being dependent on a stored product-independent characteristic value, wherein the calculating comprises:

generating an identifier that indicates an object-related dependency between the product-dependent characteristic values of the configurable product;

storing the calculated characteristic value combinations of the product-dependent characteristics;

generating, using the processor, a planning demand for the configurable product comprising at least one of the possible characteristic value combinations of product-dependent and product-independent characteristic values;

converting, using the processor, the planning demand for the configurable product into a planning demand for an actual characteristic value combination defining requirements of a sales forecast of a configured product;

receiving, using the processor, an order for the configured product;

matching, using the processor, characteristic values of the sales forecast with one or more characteristic values of the received order; and when a characteristic value of the sales order matches a characteristic value of the order, replacing, using the processor, at least one requirement of the sales forecast with a requirement of the received order.

23. The system of claim 14, further comprising:

a data storage system to store data relating to the configurable products; and a user interface for receiving input of a selection to be represented for the configured products.

* * * * *